(No Model.)

E. W. JOHNSON.
GRAIN DRIER.

No. 315,508. Patented Apr. 14, 1885.

WITNESSES

E. W. Johnson
INVENTOR by C. A. Snow & Co.
Attorneys (No Model.) 2 Sheets—Sheet 2.

E. W. JOHNSON.
GRAIN DRIER.

No. 315,508. Patented Apr. 14, 1885.

WITNESSES
H. W. Mortimer
E. G. Siggers

E. W. Johnson
INVENTOR
by C. A. Snow & Co
Attorneys

UNITED STATES PATENT OFFICE.

ELLIOTT WEBSTER JOHNSON, OF TRUMANSBURG, NEW YORK, ASSIGNOR TO MARY E. JOHNSON, OF SAME PLACE.

GRAIN-DRIER.

SPECIFICATION forming part of Letters Patent No. 315,503, dated April 14, 1885.

Application filed June 3, 1884. (No model.)

*To all whom it may concern:*

Be it known that I, ELLIOTT W. JOHNSON, a citizen of the United States, residing at Trumansburg, in the county of Tompkins and State of New York, have invented a new and useful Grain-Drier, of which the following is a specification, reference being had to the accompanying drawings.

This invention has relation to grain-driers for drying grain by steam; and it consists in the construction and novel arrangement of parts, as will be hereinafter fully described, and particularly pointed out in the claims.

Figure 1:
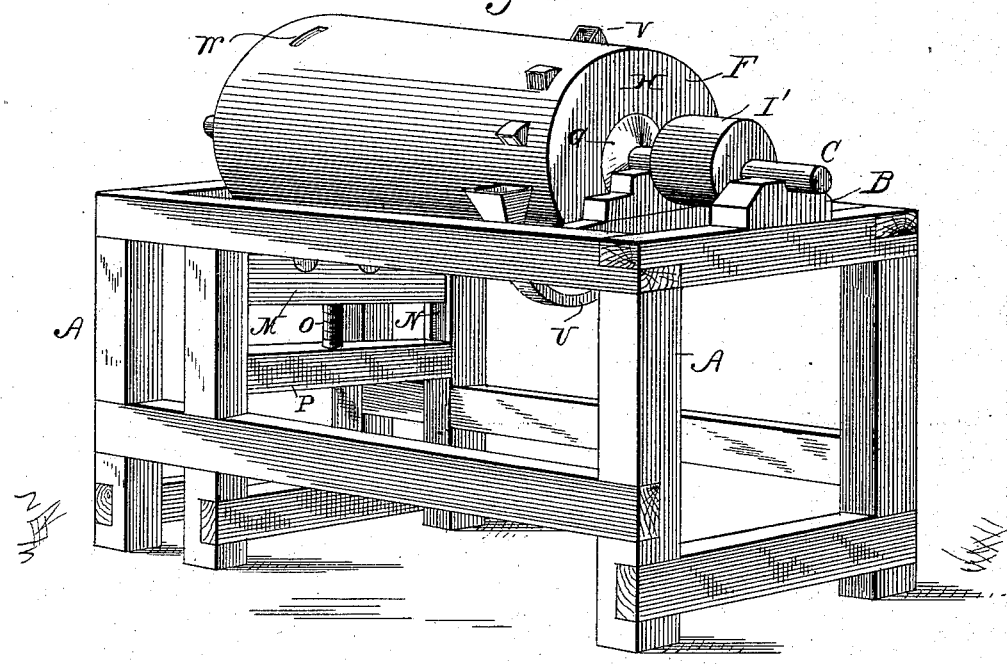
Figure 2:
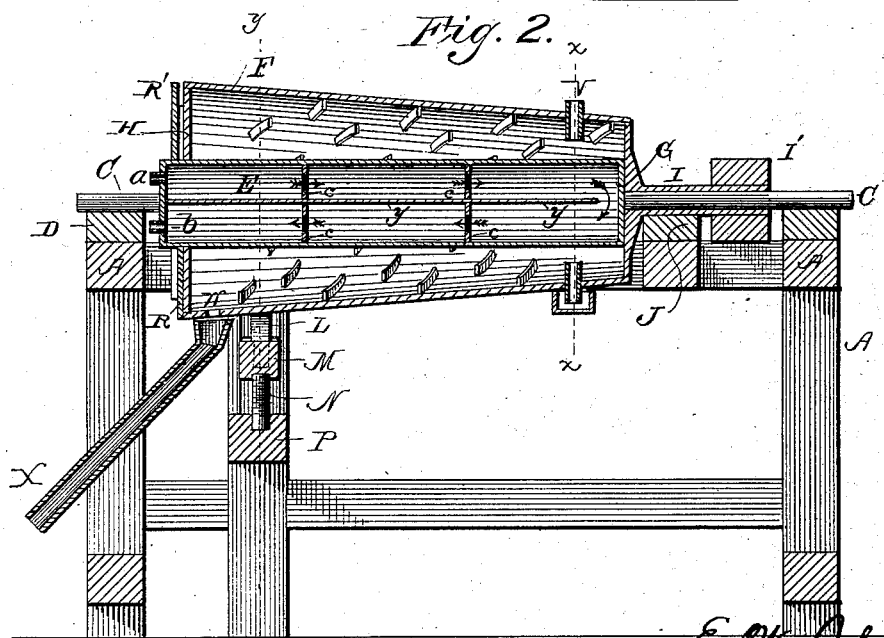
Figure 3:
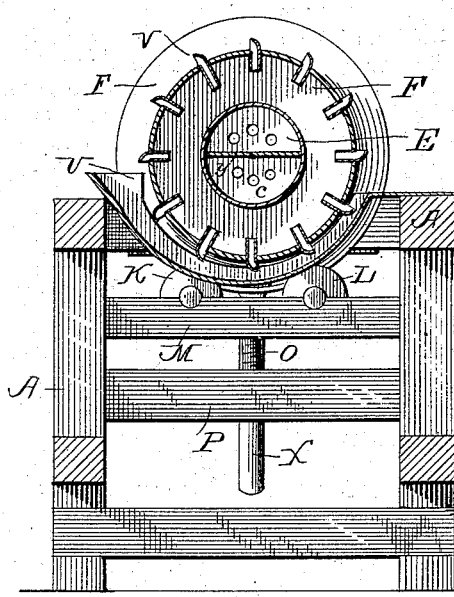
Figure 4:
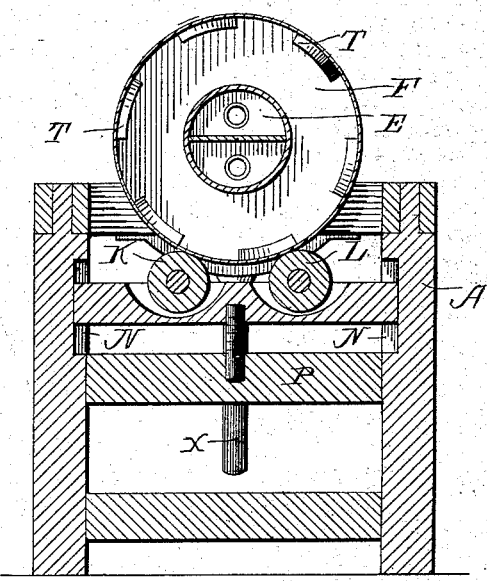
Figure 5:
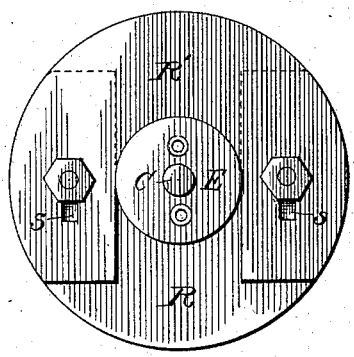

Figure 1 is a view in perspective of a grain-drier embodying my improvements. Fig. 2 is a vertical longitudinal section taken through the axes of the grain-cylinder and steam-cylinder shafts. Fig. 3 is a transverse vertical section on the line $x\ x$ in Fig. 2. Fig. 4 is a transverse vertical section on the line $y\ y$ in Fig. 2, and Fig. 5 is a detail view of the back heads of the grain-cylinder.

Referring by letter to the accompanying drawings, A designates the frame of the machine, which is provided with a bearing, B, for the steam-cylinder shaft C at one end, and a bearing, D, for said shaft C at the other end. The steam-cylinder E is stationary, and extends to the head of the grain-cylinder F. The grain-cylinder F is of wood with cast-iron heads G and H. The head G is provided with a hollow shaft, I, with a hollow pulley, I', fixed thereon, and one end of the shaft C of the steam-cylinder E passes through this hollow shaft and the hollow pulley thereon. The hollow shaft I rests on a bearing, J, on the frame A. The tail of the grain-cylinder rests on two anti-friction wheels, K L, journaled in a transverse bar, M, beneath the grain-cylinder. This transverse bar M is adjusted vertically in vertical guides N N, rising from the sills of the frame a short distance from the tail end of the frame, by a jack-screw, O, having bearings in the cross-piece P and in the transverse bar M, so that the inclination of the grain-cylinder can be adjusted to regulate the length of time that the grain shall remain in the cylinder before being discharged. The back heads, R R', for the tail of the grain-cylinder are made in the form of the section of an annular disk cut out to fit partially around the steam-cylinder. The back head R is put in place with its mouth opening upward. The back head R' is then put on over this with its mouth opening downward, or just the reverse of the head R, so that the arms of the two heads R R' lap. These arms are provided with elongated slots S S, which register when the heads are in place, and through these slots S S the securing-bolts project, and are provided with nuts to hold the back heads in place. By means of the slots S S the back heads can be adjusted to conform to the inclination given the tapering grain-cylinder when the transverse bar M is adjusted. The grain-cylinder tapers, as shown, the head being the smaller end. The inner periphery of the wooden grain-cylinder is provided with cleats or conveyers T, except at the last foot of the cylinder next to the tail of the cylinder, which is left plain.

A semicircular feed-trough, U, is provided near the head of the grain-cylinder, from which the buckets V, projecting from the periphery of the grain-cylinder, take the grain and convey it into the cylinder F. These grain buckets or spouts V extend back into the grain-cylinder F on an inclined position for a distance of about four inches, in order to prevent the grain from falling out through the buckets that are at the bottom of the cylinder when it is let into the cylinder F from those buckets at the top. The grain-discharge W is quite near the tail of the cylinder F, and a grain board or chute, X, is provided beneath it to convey the discharged grain to the sacks or to an elevator.

The steam-cylinder E is divided horizontally to within about six inches of the head or driving end of the machine, and the steam enters the cylinder E above the partition Y through a steam-pipe, $a$, and comes out below the partition Y through a pipe, $b$, so that the condensed steam is all carried out below. I provide the steam-cylinder with port-heads $c\ c$, in order to stop the force of the steam a little and retain it longer in the cylinder.

The operation is simple, and is as follows: Steam is admitted to the steam-cylinder, which is stationary in its bearings, and the grain-cylinder is revolved. The grain is taken from the semicircular feed-trough by the buckets and conveyed into the grain-cylinder. The cleats on the inner surface elevate the grain to the top of the cylinder F, when it falls to the bottom, where it is taken by other cleats, and is thus worked toward the plain portion of the grain-cylinder, on which it travels to the discharge-opening W, where it falls onto the grain-board X and slides into the sack or elevator.

In its passage through the grain-cylinder the grain has been subjected to the requisite temperature to thoroughly dry it, and is ready for storage or shipment. The greater the incline of the grain-cylinder the greater the rapidity with which the grain will travel through said cylinder. Therefore, the time of the travel of the grain is regulated by adjusting the transverse bar M, having the friction-wheels.

In order to point out more clearly the scope of my invention, I would have it understood that I do not seek to claim anything shown in the patents of Henry Cutler, No. 269,644, dated December 26, 1882, or Henry Coker, No. 249,009, dated November 1, 1881; but,

Having thus fully described my invention, what I claim as new, and desire to secure by Letters Patent of the United States, is—

1. The combination, in a grain-drier, with a steam-cylinder, of a partition extending nearly the entire length of the same and dividing said cylinder into two compartments having communication at one end, port-heads located in said compartments and having holes or openings, and an inlet and outlet opening communicating with said compartments, substantially as set forth.

2. In a grain-drier, the combination, with a stationary steam-cylinder, of a grain-cylinder inclosing the same, a series of radially-arranged buckets on said grain-cylinder, a discharge-opening, and a series of interiorly-arranged conveyers, substantially as set forth.

3. The combination, with the frame having bearings and vertical guides substantially as described, of the steam-cylinder extending to the head of the revolving grain-cylinder, the grain-cylinder provided with inclined grain-buckets extending within the cylinder as described, conveyer-cleats on the interior of said cylinder except near the grain-discharge, a grain-discharge opening located at one end of the cylinder, the semicircular feed-trough located adjacent to the other end of the cylinder, and adjustable back heads, and mechanism, substantially as described, for adjusting the tail of the rotary cylinder, as set forth.

4. The combination, with the frame and revolving cylinder provided with the inclined grain-buckets projecting outwardly from its periphery and extending inwardly for several inches, of the semicircular feed-trough beneath the revolving cylinder, substantially as specified.

In testimony that I claim the foregoing as my own I have hereto affixed my signature in presence of two witnesses.

ELLIOTT WEBSTER JOHNSON.

Witnesses:
FRED. D. BARTO,
R. VRENAM BARTO.